United States Patent [19]

Edry

[11] Patent Number: 5,560,667
[45] Date of Patent: Oct. 1, 1996

[54] EXPANDABLE LINKAGE

[75] Inventor: John E. Edry, Warren, Mich.

[73] Assignee: The United States of America as represented by the Secretary of the Army, Washington, D.C.

[21] Appl. No.: 375,337

[22] Filed: Jan. 18, 1995

[51] Int. Cl.⁶ .................................................. B60R 27/00
[52] U.S. Cl. ............................................. 296/26; 296/175
[58] Field of Search ........................... 296/26, 171, 175; 52/67

[56] References Cited

U.S. PATENT DOCUMENTS

| | | | |
|---|---|---|---|
| 4,049,310 | 9/1977 | Yoder | 296/26 |
| 4,480,866 | 11/1984 | Komatsu | 296/26 X |
| 4,932,703 | 6/1990 | Chamberlin et al. | 296/26 |
| 5,171,056 | 12/1992 | Faludy et al. | 296/26 X |
| 5,248,180 | 9/1993 | Hussaini | 296/171 |

*Primary Examiner*—Joseph D. Pape
*Attorney, Agent, or Firm*—Peter A. Taucher; David L. Kuhn

[57] ABSTRACT

An expansion linkage effects nearly perfectly straight translation of an expansion module relative to a trailer. The linkage has two relatively longer cross arms pivoted together at their intersection. One cross arm is additionally pivoted at its mount to the trailer and the other cross arm is additionally pivoted at its mount to the module. At opposite ends from the mounts, the cross arms have relatively shorter linkage arms pivoted thereto. The linkage arm pivoted to the trailer-mounted cross arm also pivotally connects to the module, and the linkage arm pivoted to the module-mounted cross arm also pivotally connects to the trailer. The intersection of the cross arms is ⅔ to ¾ the distance from pivot axes at the cross arms' mount ends to pivot axes at the cross arms' opposite ends.

9 Claims, 3 Drawing Sheets

EXPANDABLE LINKAGE

GOVERNMENT USE

The invention described here may be made, used and licensed by or for the U.S. Government for governmental purposes without paying me royalty.

BACKGROUND AND SUMMARY

Land based military forces use specialized trailers as mobile command posts, communication centers and in-field combat support locations. These trailers may have box-like expansion modules that translate outboard to enlarge interior space of the trailer. Various mechanisms have been used to translate the extension modules. Many such mechanisms have insufficiently straight, level translation paths of the module, whereby elements of the module's roof and floor bind with elements of the trailer's roof and floor.

My expansion linkage provides essentially straight line module translation and thus prevents binding between the module and the trailer. My linkage has two cross arms intersecting to form a scissor-like connection. One is a trailer cross arm that pivots to the trailer and the other is a module cross arm that pivots to the module. The cross arms' pivot axes are at ends of the cross arms, and lie in a line generally parallel to the module's translation path. At opposite ends of the cross arms from their pivot axes are swingable linkage arms. One linkage arm connects the trailer cross arm to the module while the other linkage arm connects the module cross arm to the trailer. The intersection of the cross arms is ⅔ to ¾ the distance from the cross arms' pivot axes to their connections with the linkage arms.

DETAILED DESCRIPTION

Figure 1:
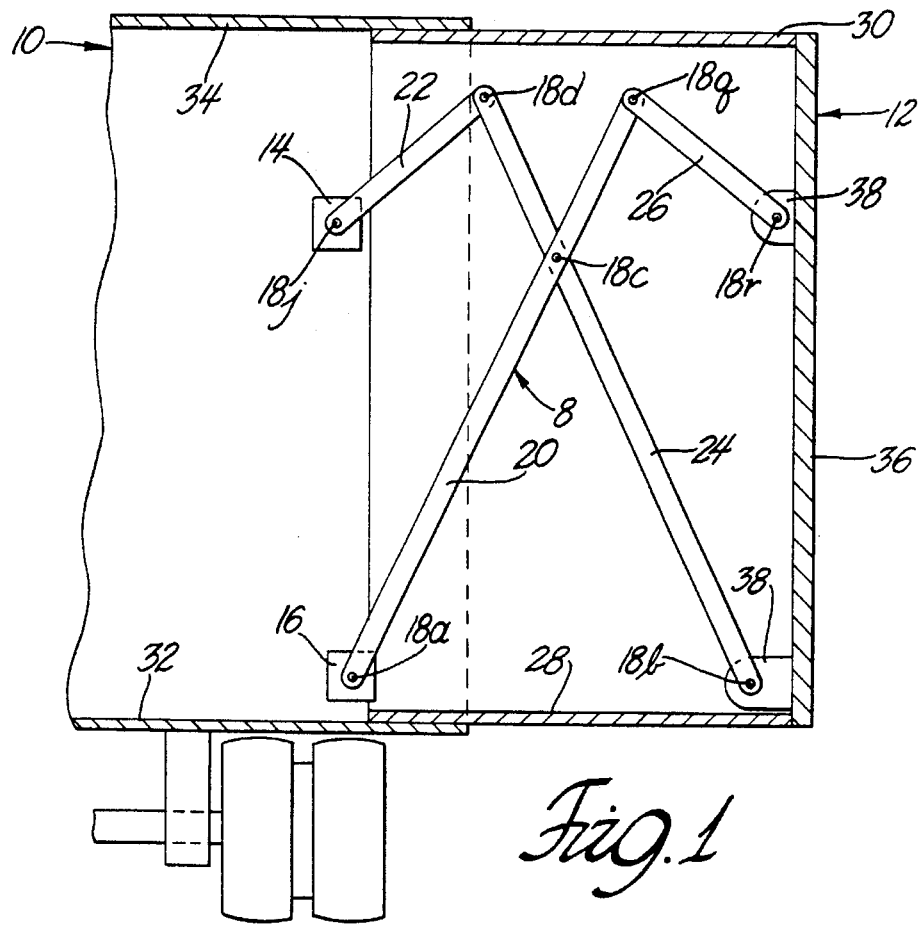
FIG. 1 is a sectioned end elevational view of a trailer having an expansion module connected thereto by my linkage.

FIG. 1 is a partly sectioned end view of the right side of trailer unit 10 having a typical expansion module 12, which can be translated inboard or outboard of the trailer by linkage 8. The module's wall 36 attaches to outer edges of module roof 30 and module floor 28. The inner edge of module roof 30 faces trailer roof 34 and is slightly spaced therefrom, and the inner edge of module floor 28 likewise faces trailer floor 32 and is slightly spaced therefrom. Module 12 normally has front and rear panels (not shown) fit with wall 36, roof 30 and floor 28 so that module 12 opens only toward the inboard of trailer unit 10. Module 12 is one example of many expansion modules or extension bodies that can be used with linkage 8. Likewise, trailer 10 is only one of many possible vehicles or other base structures from which module 12 can be extended via linkage In linkage 8, the lower end of first cross arm 20 swingably mounts via pivot pin $18a$ to a block 16 fixed to unit 10. Second cross arm 24 swingably mounts at its lower end via pivot pin $18b$ to bracket 38, which is fixed to expansion module 12. Cross arms 20 and 24 are joined by pivot pin $18c$ at a point equidistant from the axes of pins $18a$ and $18b$. Pin $18c$ is about ⅔ to ¾ of the distance from the cross arms' lower ends to their upper ends. Pin $18q$, at the upper end of cross arm 20, pivots one end of link arm 26 to cross arm 20 and pin $18r$ pivots the other end of link arm 26 to a bracket 38 fixed to expansion module 12. Similarly, pin $18d$ pivots one end of link arm 22 to cross arm 24 and pin $18j$ pivots the other end of link arm 22 to a block 14 fixed to unit 10. As can be seen in FIG. 1, the linkage arms are typically much shorter than the cross arms.

Figure 2:
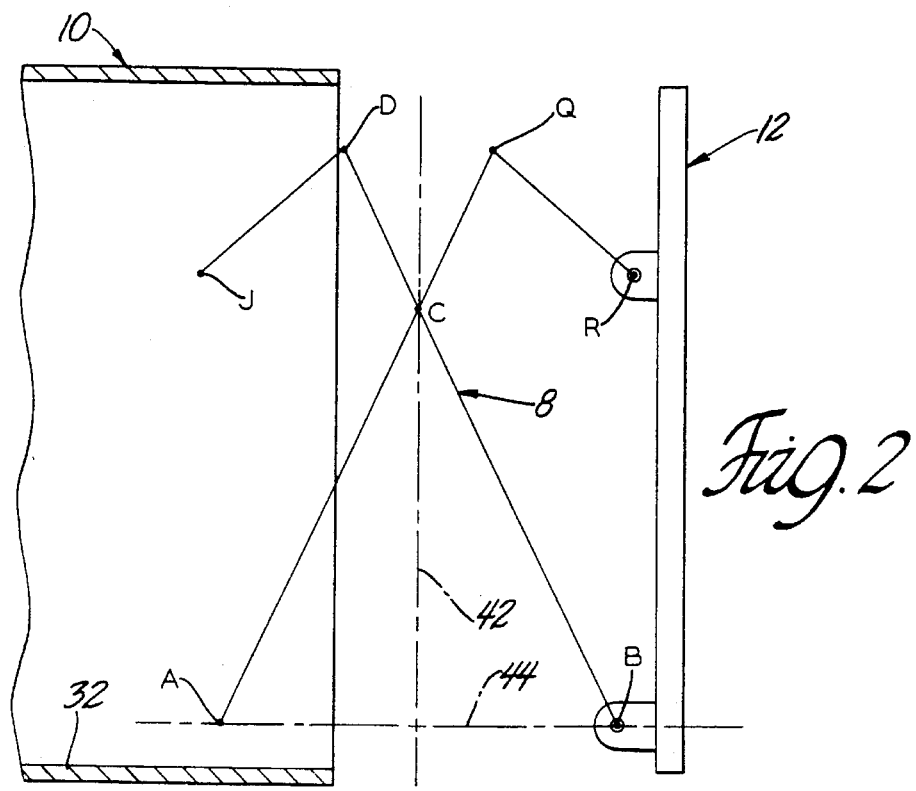
FIG. 2 is a schematic representation of the linkage shown with portions of the trailer and module removed.

FIG. 2 is a semi-schematic view of the FIG. 1 structure where details of trailer unit 10 and module 12 are omitted, and linkage 8 is represented by points and lines. Points A, B, C, D, J, Q, and R represent the axes of respective pins $18a$, $18b$, $18c$, $18d$, $18j$, $18q$ and $18r$ in FIG. 1. Lines AQ, JD, BD and QR in FIG. 2 correspond to respective arms 20, 22, 24 and 26 in FIG. 1. Linkage 8 is bilaterally symmetric with respect to bisector line 42 normal to trailer floor 32.

Figure 3:
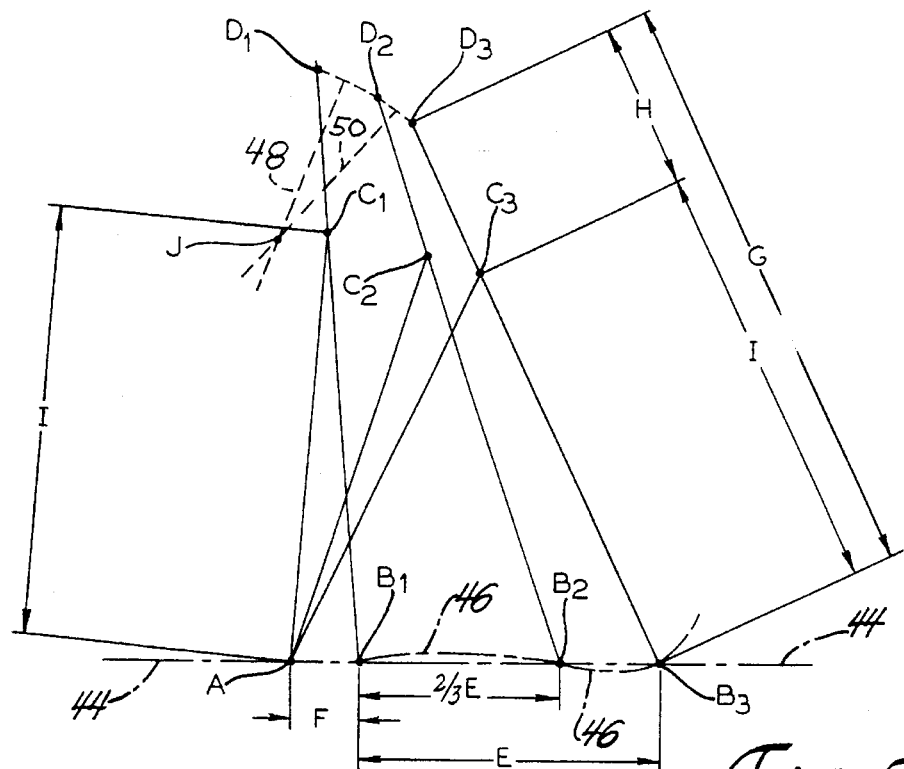
FIG. 3 is a diagram that illustrates various juxtapositions of rotational axes of the expansion linkage.

FIG. 3 will be used for a demonstration of how positions of points A, B, C, D, J and Q are determined. The demonstration will use straight reference line 44, which passes through point A, is parallel to floor 32 and typically is parallel to the ground. In FIG. 3, point A is sufficiently inboard in unit 10 (FIG. 1) so that linkage 8, when collapsed, fits into the unit. Point $B_1$ on line 44 is where point B (or axis of pin $18b$) is in unit 10 when linkage 8 fully collapses. Dimension "F" of line $AB_1$ is the axis-to-axis distance between pins $18a$ and $18b$ when linkage 8 fully collapses. Point $B_3$ is the location of point B or the axis of pin $18b$ when linkage 8 is fully expanded, and is at the intersection of line 44 and path 46 at distance E from point $B_1$. Point $B_2$ is on line 44 between $B_1$ and $B_3$ at a distance ⅔ E from $B_1$.

As linkage 8 expands, point B moves from point $B_1$ along essentially straight path 46, the slight curves of path 46 being exaggerated for illustration in FIG. 3. Path 46 may be regarded as having a somewhat sinusoidal shape. Between points $B_1$ and $B_3$, path 46 typically is no more than several hundredths of an inch away from line 44. Point B (and axis $18b$) is limited in motion to path 46. Since path 46 is essentially straight, module 12 has an essentially straight inboard or outboard translation.

Lines $B_1D_1$, $B_2D_2$ and $B_3D_3$ are equal to the axis-to-axis distance between pin $18b$ and pin $18d$ of arm 24 (FIG. 1). This distance is found empirically for a given unit 10, and a length for line segment $B_1C_1$ is then chosen from values ⅔ to ¾ as long as line $B_1D_1$, and segments $B_2C_2$ and $B_3C_3$ will equal segment $B_1C_1$ in length. Points $C_1$, $C_2$ and $C_3$ are placed so that point $C_1$ is equidistant from points A and $B_1$, $C_2$ is equidistant from points A and $B_2$, and point $C_3$ is equidistant from points A and $C_3$. Locating points $C_1$, $C_2$ and $C_3$ determines placement for points $D_1$, $D_2$ and $D_3$, and the latter points define an arc whose center is point J. Point J is at the intersection of perpendicular bisectors 48 and 50 of any two chords such as lines $D_1D_2$ or $D_2D_3$.

Returning to FIG. 2, points A and B are placed apart on line 44 by a distance equal to the length of line $AB_3$. Using data found in conjunction with FIG. 3, points C (analogous to $C_3$), D (analogous to $D_3$), and J are located. Lines ACQ and QR in FIG. 2 are mirror images of respective lines BCD and DJ, whereby points Q and R are also located. Linkage 8, as shown in FIG. 1, is fashioned with the axes of pins $18a$, $18b$, $18c$, $18d$, $18j$, $18q$ and $18r$ at locations corresponding to points A, B, C, D, J, Q and R in FIG. 2. As a variation of the foregoing method, these pin axes can also be located if points A and B are first spaced apart by the length of segment $AB_1$ or of segment $AB_2$ of FIG. 3.

Figure 4:
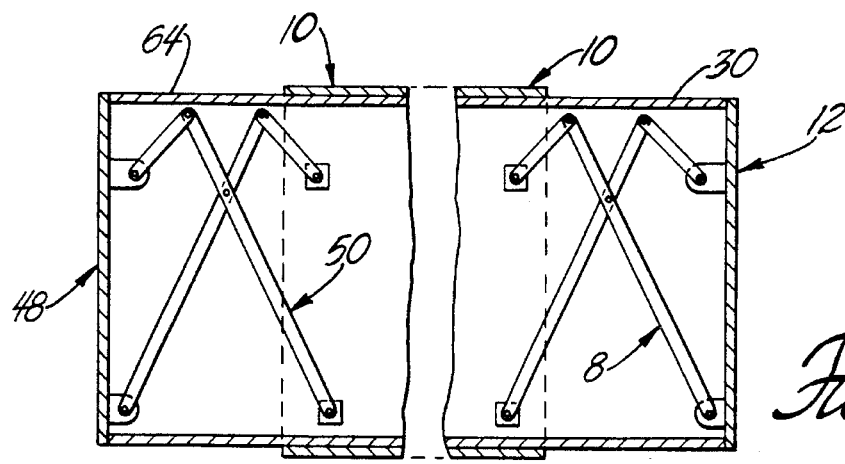
FIG. 4 is a sectioned partial end view of a trailer unit having expansion modules on opposed sides of the trailer, wherein the modules are connected to the trailer by my linkages.

It is contemplated that unit 10 will normally have two expansion modules such as expansion module 12, one module being on either side of unit 10. Such an arrangement is seen in FIG. 4, where expansion module 12 is on the right side of unit 10, and a mirror-image counterpart, expansion module 48, is on the left side of unit 10. Module 48 is connected to unit 10 by linkage 50, a mirror-image counterpart of linkage 8.

Figure 7:
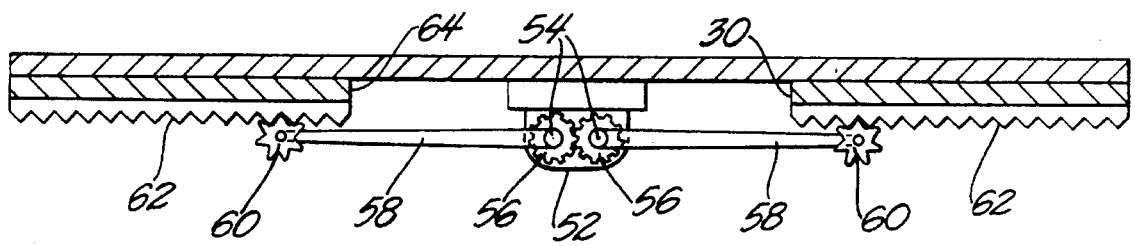
FIG. 7 is a drive mechanism for translating two expansion modules simultaneously for equal distances in opposite directions.

It is also contemplated that modules 12 and 50 will translate outboard and inboard simultaneously at equal distances, whereby movement of the modules will not affect the center of gravity of unit 10. A typical drive arrangement to achieve simultaneous and equidistant translation of the modules is shown in FIG. 7, where motor 52 has synchronized output shafts 54. Synchronization of shafts 54 can be done, for example, via identical meshing gears 56 on both shafts. Belts 58 connect shafts 54 to pinion gears 60, whose rotation translates racks 62 fixed to respective module roofs 30 and 64.

Figure 5:
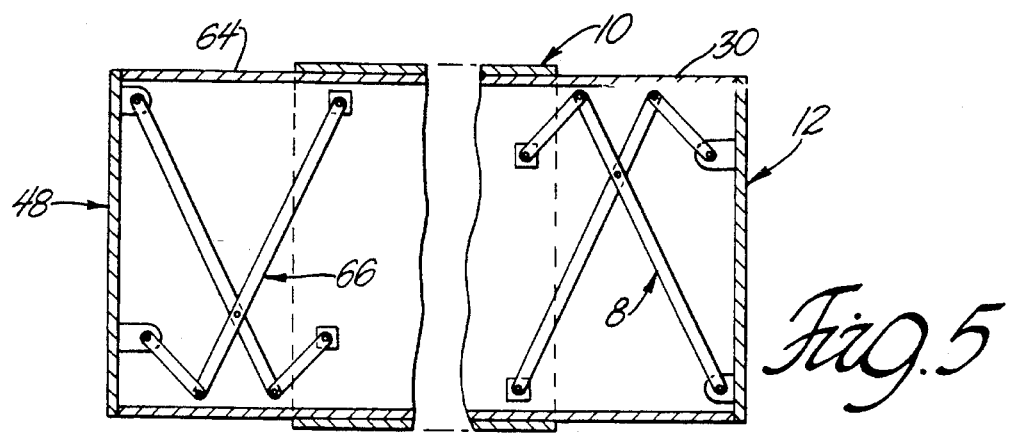
FIG. 5 is an alternate embodiment of the FIG. 4 structure.
Figure 6:
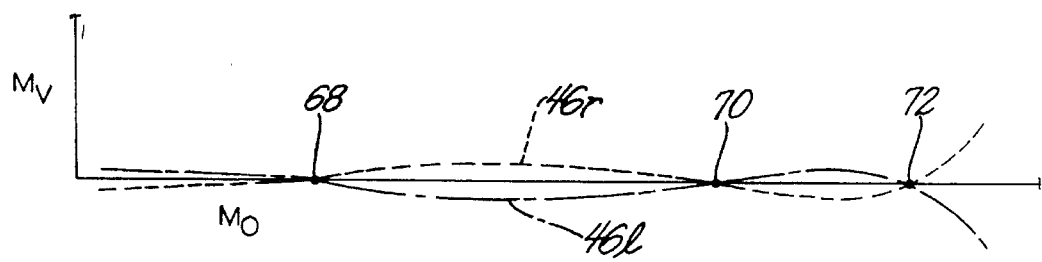
FIG. 6 is a graph representing the translation path of one of my linkage's pivot axes which is mobile relative to the trailer unit but fixed to the module.

An alternative to the FIG. 4 construction is shown in FIG. 5, where linkage 66 replaces linkage 50, linkage 66 being an inversion of linkage 50. The advantage of the FIG. 5 arrangement can perhaps best be explained in connection with FIG. 6, where $M_v$ is the vertical displacement of an expansion module and $M_o$ is the outboard movement of this module. Line 46r, analogous to line 46 in FIG. 3, represents the displacement of FIG. 5's module 12 while line 46l represents displacement of FIG. 5's module 48. From the juxtaposition of lines 46r and 46l, one sees that the expansion modules rise and fall complimentarily as they translate outboard or inboard. Thus the net amount of lifting done by motor 52 on the modules is zero, whereby the power required from the motor is constant and translation of the modules is smoother.

I wish it to be understood that I do not desire to be limited to the exact details of construction or method shown herein since obvious modifications will occur to those skilled in the relevant arts without departing from the spirit and scope of the following claims.

I claim:

1. A linkage for translating an extension body relative to a base structure along an essentially straight path, comprising:

a base cross arm;

a first connector pivoting the base cross arm to the base structure and having a first axis;

an extension linkage arm;

a second connector pivoting the extension linkage arm to the base cross arm and having a second axis;

a third connector pivoting the extension linkage arm to the extension body and having a third axis;

an extension cross arm;

a fourth connector pivoting the extension cross arm to the extension body and having a fourth axis;

a base linkage arm;

a fifth connector pivoting the base linkage arm to the extension cross arm and having a fifth axis;

a sixth connector pivoting the base linkage arm to the base structure and having a sixth axis;

a seventh connector pivoting the base cross arm to the extension cross arm and having a seventh axis;

the seventh axis being equidistant from the first and fourth axes, and being equidistant from the third and sixth axes;

the sixth axis being at an arc center about which the fifth axis traces as the linkage moves.

2. The linkage of claim 1 wherein the fourth axis is limited in motion to a path having three points in a straight line with the first axis, a first point being a nearest location of the fourth axis to the first axis, a second point being further from the first axis than the first point and a third point being ⅔ of the way from the first point to the second point.

3. The linkage of claim 2 wherein the path of the fourth axis is essentially straight but slightly sinusoidal and lies along the straight line.

4. The linkage of claim 3 wherein the linkage is mobile between retracted, extended and intermediate positions, the fourth axis being at the first, second and third point respectively in the retracted, extended and intermediate positions.

5. The linkage of claim 1 wherein the seventh axis is between ⅔ and ¾ the distance from the first axis to the third axis.

6. The linkage of claim 2 wherein the seventh axis is between ⅔ and ¾ the distance from the first axis to the third axis.

7. The linkage of claim 1 wherein the linkage is bilaterally symmetric with respect to a bisector line which passes through the seventh axis and which is perpendicular to the straight line.

8. For a vehicle having translatable expansion modules on opposed sides of the vehicle, a mechanism for translating the modules toward and from the vehicle along an essentially straight horizontal path, the mechanism including expandable linkages connecting the modules to the vehicle, wherein each linkage comprises:

a base cross arm;

a first connector pivoting the base cross arm to the base structure and having a first axis;

an extension linkage arm;

a second connector pivoting the extension linkage arm to the base cross arm and having a second axis;

a third connector pivoting the extension linkage arm to the extension body and having a third axis;

an extension cross arm;

a fourth connector pivoting the extension cross arm to the extension body and having a fourth axis;

a base linkage arm;

a fifth connector pivoting the base linkage arm to the extension cross arm and having a fifth axis;

a sixth connector pivoting the base linkage arm to the base structure and having a sixth axis;

a seventh connector pivoting the base cross arm to the extension cross arm and having a seventh axis;

the seventh axis being equidistant from the first and fourth axes, and being equidistant from the third and sixth axes;

the linkage mobile between retracted and extended positions so that the fourth axis is at a first and second point respectively during the retracted and extended positions, the points being in a straight line with the first axis, the fourth axis travelling essentially along the straight line as the linkage moves between the retracted and extended positions;

the sixth axis being at an arc center about which the fifth axis traces when the linkage moves among the positions;

wherein the mechanism further comprises means to simultaneously drive the modules toward and away from the vehicle for equal distances in opposite directions.

9. The mechanism of claim 8 wherein:

one linkage is on one side of the vehicle;

another linkage is on another, opposed side of the vehicle;

the one linkage is inverted relative to the other linkage.

* * * * *